United States Patent Office 2,941,985
Patented June 21, 1960

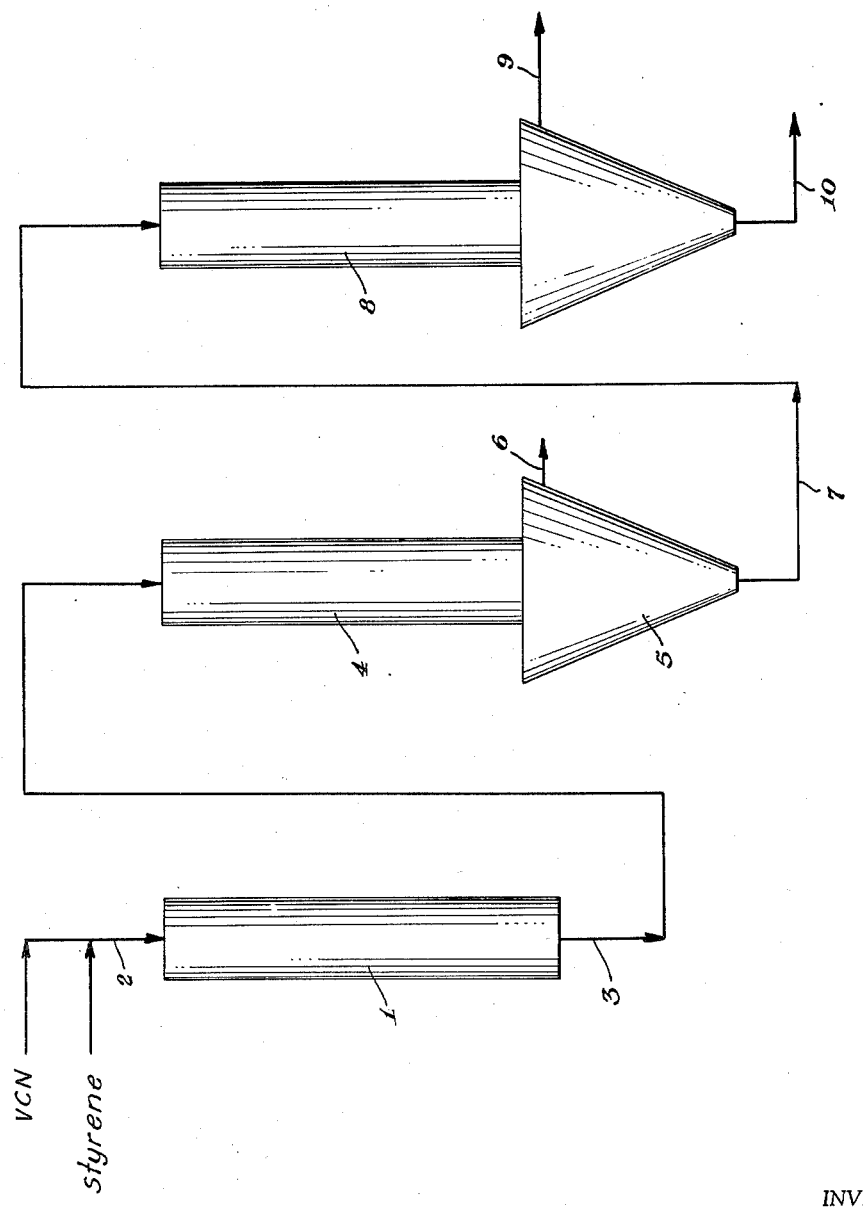
INVENTORS.
Carroll T. Miller
James L. Amos

2,941,985

TWO-STAGE DEVOLATILIZATION PROCESS FOR MAKING ALKENYL-AROMATIC HYDROCARBON-ACRYLONITRILE COPOLYMERS

James L. Amos and Carroll T. Miller, Midland, Mich., assignors to The Dow Chemical Company, Midland, Mich., a corporation of Delaware Filed Feb. 6, 1958, Ser. No. 713,768

6 Claims. (Cl. 260—80.5)

This invention concerns an improvement in processing copolymers of acrylonitrile with at least one alkenylaromatic monomer of the group of styrene and ocmethylstyrene. More particularly, it concerns a process wherein a partially polymerized mixture of acrylonitrile and one or more of the alkenylaromatic hydrocarbons indicated, the copolymeric product containing between 20 and 35 weight percent of bound acrylonitrile, the balance being a bound alkenylaromatic hydrocarbon, as indicated, is subjected to a two-stage devolatilization procedure to eliminate unreacted acrylonitrile and to control copolymerization of the reactant monomers.

It is known to prepare styrene-acrylonitrile copolymers by polymerizing a mixture of the monomers in mass. The polymerization is exothermic, and requires careful control to prevent over-heating and the consequent production of undesired low molecular weight copolymers. The mixture becomes exceedingly viscous at conversions of about 50 percent or greater, so that the polymerization is usually stopped short of completion, e.g. when from 40 to 70 percent by weight of the monomers have been copolymerized, to avoid heating of the mixture for prolonged periods of time which causes deterioration of the copolymer and the production of black specks in the product. The copolymer is recovered from the partially polymerized mixture by vaporizing the volatile ingredients, e.g. the unreacted monomers, under reduced pressure in a devolatilizing zone and separately withdrawing the vapors of the volatile ingredients and the heat-plastified copolymer from said zone.

However, the separating of the volatile ingredients and the copolymer from one another presents difficulties for the reasons that vaporizing the volatile ingredients requires that the mixture be heated at elevated temperatures while maintaining the copolymer in a heat-plastified condition and at pressures which readily vaporize the volatile ingredients therefrom. Such temperatures increase the tendency of the monomers to polymerize and unless the devolatilization is carefully controlled results in deterioration of the copolymer causing discoloration and the formation of black specks in the product. The art has sought ways in which to control the polymerization of the monomers during the devolatilization with the object of avoiding the aforementioned difficulties, but the improvement has been slight.

It has now been found that the aforementioned difficulties, particularly the discoloration and the formation of black specks in the copolymer due to decomposition of acrylonitrile or of copolymer rich in acrylonitrile can be entirely prevented or substantially eliminated by recovering the copolymer from a partially polymerized mixture of acrylonitrile and styrene or alpha-methyl styrene employing a two-stage devolatilizing procedure wherein a major portion of the unreacted acrylonitrile is separated from the solution in the first stage of the process at relatively low temperatures and the remaining volatile ingredients are vaporized from the heat-plastified copolymer at substantially higher temperatures and subatmospheric pressure in the second stage of the process.

In practice, the procedure of this invention starts with a reaction mixture of a conventionally prepared copolymer of about 20 to 35 weight percent of acrylonitrile, the balance being styrene and/or α-methylstyrene, wherein conversion has been carried out to between 40 and 70 percent copolymer, such as is shown in U.S. Patent 2,739,142, in which an aromatic hydrocarbon diluent or a nuclearly halogenated derivative thereof is used as a polymerization modifier. The reaction mixture containing polymer is then heated to between 120° and 190° C. in a first stage devolatilizer at an absolute pressure of between 150 mm. and 1000 mm. of mercury and having heat transfer surfaces no hotter than 210° C. until at least half of the free acrylonitrile present is removed. Simultaneously, polymerization continues in the first stage devolatilizer so that product therefrom contains between 60 and 95 percent of polymer, the balance being diluent and unreacted monomers. The polymer product from the first stage devolatilizer is then heated in a second stage devolatilizer to between about 210° and 260° C. at an absolute pressure not more than 150 mm. of mercury. Volatile content is thereby reduced to about one percent and the acrylonitrile to about 1000 p.p.m. or less, polymer basis, the product being about 99 percent or more of an alkenylaromatic hydrocarbon-acrylonitrile copolymer, as indicated. The finished product is a thermoplastic copolymer having good color and being substantially free of black specks. It is preferred to use a high boiling aromatic hydrocarbon or a nuclearly halogenated derivative thereof as a diluent or modifier to help volatilize the free acrylonitrile and reduce the viscosity of the reaction medium so that the exotherm is more readily controlled.

The invention is more readily understood with reference to the accompanying drawing showing a flow diagram illustrating the invention. In the drawing, 1 represents a conventional polymerizer having inlet means 2 for monomers (and diluent, when a diluent is used), outlet 3 for removing primary product consisting of polymer, monomers and diluent for delivery to first stage devolatilizer 4, advantageously a tube and shell heat exchanger, wherein the temperature of the primary polymeric product, monomers and diluent is changed to between about 120° and 190° C. at an absolute pressure of between 150 mm. and 1000 mm. of mercury, such that at least half of the free acrylonitrile is volatilized and removed therefrom. The heat transfer surfaces of the heat exchanger are not hotter than 210° C. Heat exchanger 4 has an enlarged lower section 5 wherein volatile materials including at least half of the free acrylonitrile are vaporized and removed through outlet 6. These volatiles are fed to a condenser, not shown. Product from the first stage devolatilizer is removed through outlet 7 and passed to second stage devolatilizer 8. In the second stage devolatilizer, advantageously of the tube and shell heat exchanger type, the process feed is heated to between about 210° and 260° C. at an absolute pressure of not more than 150 mm. of mercury. The volatiles are removed at outlet 9 for recovery in a condenser, not shown. Monomers are advantageously recycled. Copolymer product, consisting of about 99 percent copolymer and 1 percent volatiles, is removed at outlet 10. As shown, the devolatilizers are advantageously arranged in a generally vertical position, but can be inclined, e.g., at an angle of 30° from a vertical axis. Feed to the devolatilizers may enter at the top and volatiles be removed at the bottom, as shown in the drawing. The devolatilizers can be inverted, i.e., the enlarged portion can be at the top, then feed to the devolatilizers may enter at the bottom and volatiles be removed at the top. Alternatively, a combination of top and bottom feed to the devolatilizers can be used.

The following examples show ways in which the invention has been practiced.

EXAMPLE 1

A feed mixture of 24.7 percent acrylonitrile, 60.3 percent styrene and 15.0 percent diethylbenzene was pumped continuously into a recirculated polymerization system held at about 137° C. Product was simultaneously withdrawn from the polymerizer system and pumped into the first stage of a two stage devolatilizer system at the rate required to maintain a polymerizer product composition of about 6.5 percent acrylonitrile, 11.8 percent styrene, 15.0 percent diethylbenzene and 66.7 percent styrene-acrylonitrile copolymer.

The polymerizer product was devolatilized in two stages arranged in series, each stage consisting of the following elements: (1) a tube and shell heat exchanger to heat the polymer solution, (2) a jacketed flash tank operated under vacuum to separate vapor and viscous polymer solution, (3) vapor condenser, (4) vacuum source, (5) pump to remove polymer from the flash tank.

A. Operating condition of stage 1 devolatilizer:

(1) Feed composition: same as polymerizer product above.
(2) Temperature of heating surfaces of heat exchanger: 202° C.
(3) Polymer solution pumped into heat exchanger at 140° C. and withdrawn at 168° C.
(4) Absolute pressure in flash tank: 350 mm. mercury.

B. Operating conditions of stage 2 devolatilizer:

(1) Feed composition as obtained from stage 1 devolatilizer: 0.3 percent acrylonitrile, 2.7 percent styrene, 5.5 percent diethylbenzene and 91.5 percent copolymer.
(2) Temperature of heating surfaces of heat exchanger: 290° C.
(3) Polymer solution pumped into heat exchanger at 168° C. and withdrawn at 242° C.
(4) Absolute pressure in flash tank: 50 mm. mercury.
(5) The final product containing about 1.0 percent volatiles was cooled, pelletized and packed.

The equipment was operated 40 days continuously and then disassembled and inspected. The tubular heating surfaces of both devolatilizing stages were found to be essentially free of carbonaceous build up. Also the average speck contamination of the product was gaged by viewing a molding of the plastic ¼ in. x 2 in. x 3½ in. weighing about 32 grams, against a white background and counting visible specks was about 3 specks. All physical properties of the product were normal and satisfactory.

EXAMPLE 2

A feed mixture of 23 percent acrylonitrile, 62 percent styrene and 15 percent ethylbenzene was pumped continuously into a recirculated polymerization system held at about 150° C. Product was simultaneously withdrawn from the polymerizer system and pumped into the first stage of a two stage devolatilizer system at the rate required to maintain a polymerizer product composition of about 9.4 percent acrylonitrile, 23.3 percent styrene, 15.3 percent ethylbenzene and 52.0 percent styrene-acrylonitrile copolymer.

The polymerizer product was devolatilized in two stages using equipment the same as that described in Example 1, but with different operating conditions.

A. Operating conditions of stage 1 devolatilizer:

(1) Feed composition: same as polymerizer product above.
(2) Temperature of heating surfaces of heat exchanger: 180° C.
(3) Polymer solution pumped into heater at 155° C. and withdrawn at 126° C. (temperature reduction due to cooling effect of vaporizing monomers).
(4) Pressure in flash tank: atmospheric pressure.

B. Operating conditions of stage 2 devolatilizer:

(1) Feed composition as obtained from stage 1 devolatilizer: 3.7 percent acrylonitrile, 20.6 percent styrene, 12.6 percent ethylbenzene and 63.1 percent copolymer.
(2) Temperature of heating surfaces of heat exchanger: 275° C.
(3) Polymer solution pumped into heater at 126° C. and withdrawn at 230° C.
(4) Absolute pressure in flash tank: 100 mm. mercury.
(5) The final product containing about 1.1 percent volatiles was cooled, pelletized and packaged.

The equipment was operated seven months continuously at about the conditions defined in this example. The speck contamination count consistently remained below 3 specks per 32 grams of molded product having the dimensions as given in Example 1.

EXAMPLE 3

*Comparative Blank.*—This example shows results obtained with a conventional single stage devolatilization system.

A feed mixture of 24 percent acrylonitrile, 61 percent styrene and 15 percent ethylbenzene was pumped continuously into a recirculated polymerization system held at about 150° C. Product was simultaneously withdrawn from the polymerization system and pumped into a single stage devolatilization system at the rate required to maintain a polymerizer product composition of about 11 percent acrylonitrile, 24 percent styrene, 15 percent ethylbenzene and 50 percent styrene-acrylonitrile copolymer.

This polymerizer product was devolatilized in a single stage devolatilizer system consisting of: (1) a tube and shell heat exchanger to heat the polymerizer product, (2) a jacketed flash tank operated under vacuum to separate polymer and vapor, (3) a vapor condensing system attached to the flash tank, (4) vacuum source, (5) pump to remove the devolatilized polymer from the flash tank vacuum zone.

The devolatilizer system was operated as follows: (1) the heating surfaces of the heat exchanger were maintained at 275° C., (2) the polymer solution was pumped into the heat exchanger at the rate required to enter at 150° C. and to leave at 240° C., (3) the flash tank and condenser were held at about 100 mm. mercury absolute pressure, (4) the condensed volatile matter was recycled to the polymerizer, (5) the final devolatilized polymer product, containing about 1.0 percent volatiles, was pumped from the bottom of the flash tank at 240° C., pelletized and packaged.

The system produced a styrene-acrylonitrile copolymer having excessive black speck contamination, as determined by the procedure of Example 1. When a mechanically cleaned heat exchanger was first put into service at the operating conditions as defined above, the product contained less than 10 specks per 32 grams of molding, but contamination progressively increased with the length of continuous operating and at the end of about 20 days the product normally contained about 100 specks per 32 grams.

After a build up of a high level of specks in the product, the heat exchanger was regularly disassembled and visually inspected. A dense coating of black, carbonaceous material was always observed on the heat exchanger heating surfaces. All efforts to correct this tendency of the metal heating surface to foul at high temperature in the presence of large amounts of acrylonitrile vapor failed.

EXAMPLE 4

*Comparative blank.*—This example is presented to show the detrimental effect of too high a temperature in the first stage of a two stage devolatilization.

A feed mixture of 28 percent acrylonitrile, 62 percent alpha-methylstyrene and 10 percent styrene was pumped continuously into a recirculated polymerization system held at about 112° C. Product was simultaneously withdrawn from the polymerizer system and pumped into the first stage of a two stage devolatilizer system at the rate required to maintain a polymerizer product composition of about 11 percent acrylonitrile, 29 percent alpha-methylstyrene, 3 percent styrene and 57 percent copolymer.

The polymerizer product was devolatilized in two stages using the elements of equipment as described in Example 1, but using operating conditions in the devolatilizing steps as defined below:

A. Operating conditions of stage 1 devolatilizer:

(1) Feed composition: same as polymerizer product above.
(2) Temperature of heat exchanger heating surfaces: 260° C.
(3) Polymer solution pumped into heater at 112° C. and withdrawn at 180° C.
(4) Absolute pressure in flash tank: 400 mm. mercury.

B. Operating conditions of stage 2 devolatilizer:

(1) Approximate feed composition as obtained from stage 1 devolatilizer: 0.3 percent acrylonitrile, 12 percent alpha-methylstyrene, 1 percent styrene and 87 percent copolymer.
(2) Temperature of heat exchanger heating surfaces: 285° C.
(3) Polymer solution pumped into heat exchanger at 180° C. and withdrawn at 248° C.
(4) Absolute pressure in flash tank: 5 mm. mercury.
(5) The final product containing about 1.1 percent volatile matter was cooled, pelletized and packaged.

After 15 days of operation at the conditions defined above, contamination of the product was 120 specks, as determined by the method of Example 1. Samples withdrawn between stage 1 and stage 2 devolatilizers contained about the same level of contamination as the final product indicating that the stage 1 devolatilizer was the major source of product contamination.

EXAMPLE 5

This example, which differs from Example 4 in that the devolatilizers were operated within the scope of the invention, is presented to show the different results obtained, as compared with Example 4.

A. Feed composition and polymerizer operation were the same as in Example 4.

B. Operating conditions of stage 1 devolatilizer:

(1) Feed composition: 11 percent acrylonitrile, 29 percent alpha-methylstyrene, 3 percent styrene and 57 percent copolymer.
(2) Temperature of heat exchanger heating surfaces: 200° C.
(3) Polymerizer product pumped into heat exchanger at 112° C. and withdrawn at 159° C.
(4) Absolute pressure in flash tank: 150 mm. mercury.

C. Operating conditions of stage 2 devolatilizer:

(1) Approximate feed composition from stage 1 devolatilizer: 0.5 percent acrylonitrile, 14 percent alpha-methylstyrene, 1.5 percent styrene and 84 percent copolymer.
(2) Temperature of heat exchanger heating surfaces: 290° C.
(3) Polymer solution pumped into heater at 159° C. and withdrawn at 250° C.
(4) Absolute pressure in flash tank: 100 mm. mercury.
(5) The final product containing about 2.4 percent volatile matter was cooled, pelletized and packaged.

D. Product contamination: 2 specks by method of Example 1.

Examples 4 and 5 were run in the same equipment without shutdown or any sort of equipment clean up. Speck count data were obtained 10 days after changing from the operating conditions of Example 4 to those of Example 5. When the 10 percent styrene was substituted by an equal amount of alpha-methylstyrene, an equally good acrylonitrile-alpha-methylstyrene copolymer was obtained by the procedure of Example 5.

EXAMPLE 6

A feed mixture of 24 percent acrylonitrile, 56 percent styrene and 20 percent diethylbenzene was pumped continuously into a recirculated polymerization system held at about 122° C. Product was simultaneously withdrawn from the polymerizer system and pumped into the first stage of a two stage devolatilizer system at the rate required to maintain a polymerizer product composition of about 5.0 percent acrylonitrile, 12.5 percent styrene, 20 percent diethylbenzene and 62.5 percent styrene-acrylonitrile copolymer.

The polymerizer product was devolatilized, using the elements of equipment as described in Example 1, using operating conditions in the devolatilizing steps as defined below.

A. Operating conditions of stage 1 devolatilizer:

(1) Feed composition: same as polymerizer product above.
(2) Temperature of heat exchanger heating surfaces: 200° C.
(3) Polymer solution pumped into heater at 122° C. and withdrawn at 168° C.
(4) Absolute pressure in flash tank: 200 mm. mercury.

B. Operating conditions of stage 2 devolatilizer:

(1) Feed composition as obtained from stage 1 devolatilizer: 0.2 percent acrylonitrile, 3.7 percent styrene, 9.1 percent diethylbenzene and 87 percent copolymer.
(2) Temperature of heat exchanger heating surfaces: 290° C.
(3) Polymer solution pumped into heater at 168° C. and withdrawn at 244° C.
(4) Absolute pressure in flash tank: 20 mm. mercury.
(5) The final product containing about 0.8 percent volatile matter was cooled, pelletized and packaged.

Examples 4, 5 and 6 were spot checks in a long, continuous run in the same equipment with no heat exchanger clean up of any sort. Time sequence of these examples in the total run was as follows: (1) Example 4 was 15 days after start up, (2) Example 5 was 10 days after changing from conditions of Example 4, (3) Example 6 was 35 days after Example 5 and a total of 45 days after changing from the conditions of Example 4.

At the end of this 60 day continuous run, the equipment was disassembled and visually inspected. The tubular heat exchangers were observed to be essentially free of carbonaceous build up on the heating element surfaces, in contrast to repeated observations of heating element fouling in operations similar to Example 3. The stage 1 heat exchanger was not inspected in Example 4, but the high black speck count similar to that of Example 3 suggests that it was fouled at the operating conditions of Example 4. However, at the end of the 60 day run it was clean, and presumably the 45 days of low temperature operation as outlined in Examples 5 and 6 cleaned the heat exchanger elements.

What is claimed is:

1. In a process for copolymerizing at least one alkenyl-aromatic hydrocarbon of the group consisting of styrene and alpha-methylstyrene with acrylonitrile wherein the weight proportion of acrylonitrile is varied between 20 and 35 percent of the comonomers, and the weight percent of comonomers ranges between 70 and 85 percent, the balance being an aromatic diluent of the group consisting of hydrocarbons and ar-halogenated hydrocarbons having a boiling range between about 120° and 200° C., wherein conversion to copolymer is carried out to between 40 and 70 weight percent of the monomers, the improvement which consists in subjecting the reaction mixture containing said copolymer, comonomers and diluent to a two-stage devolatization process, the first stage of which is carried out at a temperature ranging between 120° and 190° C. achieved by heat transfer surfaces which are below 210° C. and at an absolute pressure between about 150 mm. and 1000 mm. of mercury such that the free acrylonitrile content is reduced by at least 50 percent, and thereafter subjecting the product from the first stage devolatilization to a second stage devolatilization step carried out at a temperature ranging between about 210° and 260° C. and at an absolute pressure of not more than 150 mm. of mercury to reduce the volatiles in the product coming from said second stage devolatilization to about one percent and to increase copolymer content to about 99 percent, and recovering an alkenyl-aromatic hydrocarbon-acrylonitrile copolymeric product which is substantially free of acrylonitrile.

2. The process of claim 1 wherein the comonomers are styrene and acrylonitrile.

3. The process of claim 2 wherein ethylbenzene is employed as a diluent.

4. The process of claim 2 wherein diethylbenzene is employed as a diluent.

5. The process of claim 1 wherein the comonomers are styrene, alpha-methylstyrene and acrylonitrile.

6. The process of claim 1 wherein the comonomers are alpha-methylstyrene and acrylonitrile.

References Cited in the file of this patent

UNITED STATES PATENTS

| | | |
|---|---|---|
| 2,739,142 | Jones et al. | Mar. 20, 1956 |
| 2,745,824 | Melchore | May 15, 1956 |